Inventor
Julius Wesley Patterson
By *Faust F. Crampton*
Attorney

Aug. 23, 1932.  J. W. PATTERSON  1,873,018
SCOOP STRUCTURE
Filed April 22, 1931  4 Sheets-Sheet 2
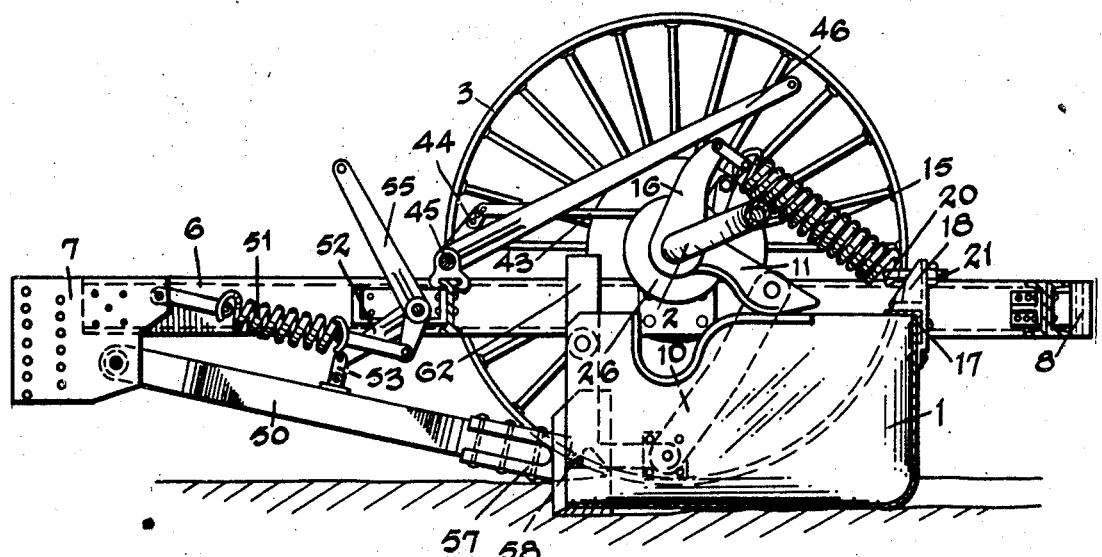
Fig.3
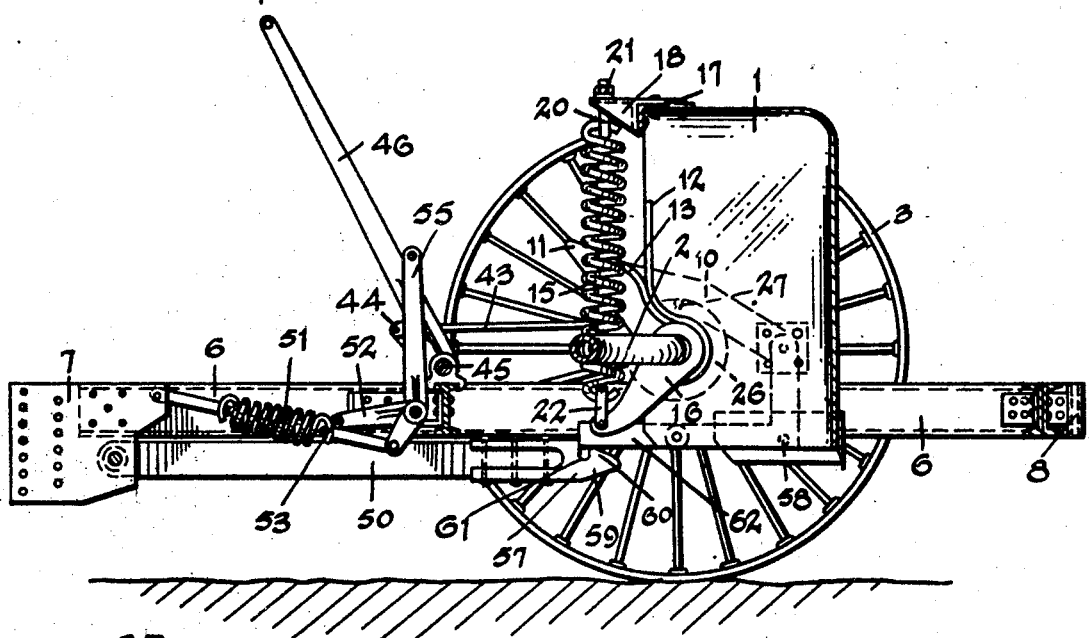
Fig.4
Fig.5
Inventor
Julius Wesley Patterson
By Faust & Crampton
Attorney

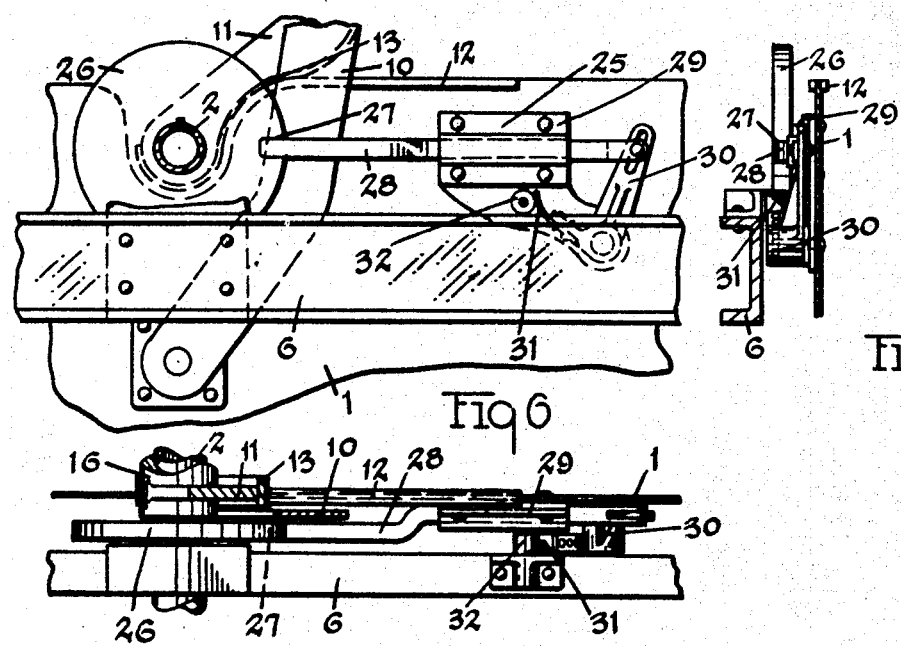

Aug. 23, 1932.  J. W. PATTERSON  1,873,018
SCOOP STRUCTURE
Filed April 22, 1931  4 Sheets-Sheet 4

Inventor
Julius Wesley Patterson
Attorney

Patented Aug. 23, 1932

1,873,018

UNITED STATES PATENT OFFICE

JULIUS WESLEY PATTERSON, OF BUCYRUS, OHIO

SCOOP STRUCTURE

Application filed April 22, 1931. Serial No. 531,894.

My invention has for its object to provide a vehicle scoop structure that is so formed that the scoop bowl will be lowered automatically into earth gathering position and raised to load carrying and dumping positions by the traction of the movable supporting members, such as the wheels of a sulky scoop or the movable members of a track layer or crawler that may be provided for conveyance of the scoop. Hereinafter I refer to wheels and crawler as, broadly, movable supporting members. Preferably it is lowered to load gathering position by one or more elastic members, such as springs or pneumatic devices, that are distorted or distended or compressed from the normal by the traction of the movable supporting members when the scoop bowl is raised to a load carrying position. Thus one or more spring members may be used to force it to the load gathering position in addition to the weight of the bowl and, during the movement of the scoop structure against the surface of the ground, cause the bowl to gather material.

The invention consists in other features and advantages which will appear from the following description and upon examination of the drawings. Structures containing the invention may partake of different forms and may be varied in their details and still embody the invention. To illustrate a practical application of the invention, I have selected a sulky scoop structure embodying the invention as an example of the various structures and the details of such structures that contain the invention, and shall describe the selected structure hereinafter, it being understood that variations may be made and that certain features of my invention may be used to advantage without a corresponding use of other features of the invention, and the scoop may be conveyed and operated by traction members of different forms without departing from the spirit of the invention. The particular structure selected is shown in the accompanying drawings.

Figure 1:
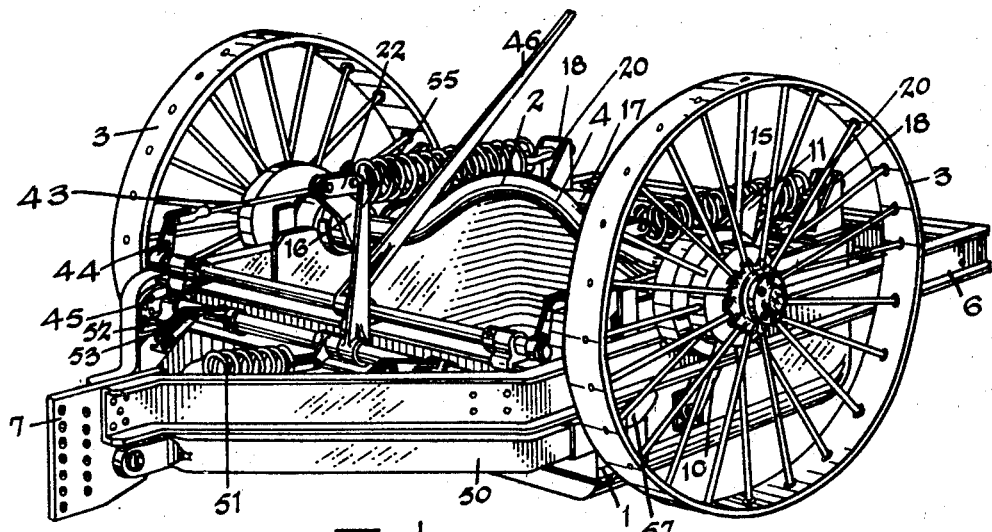
Figure 2:
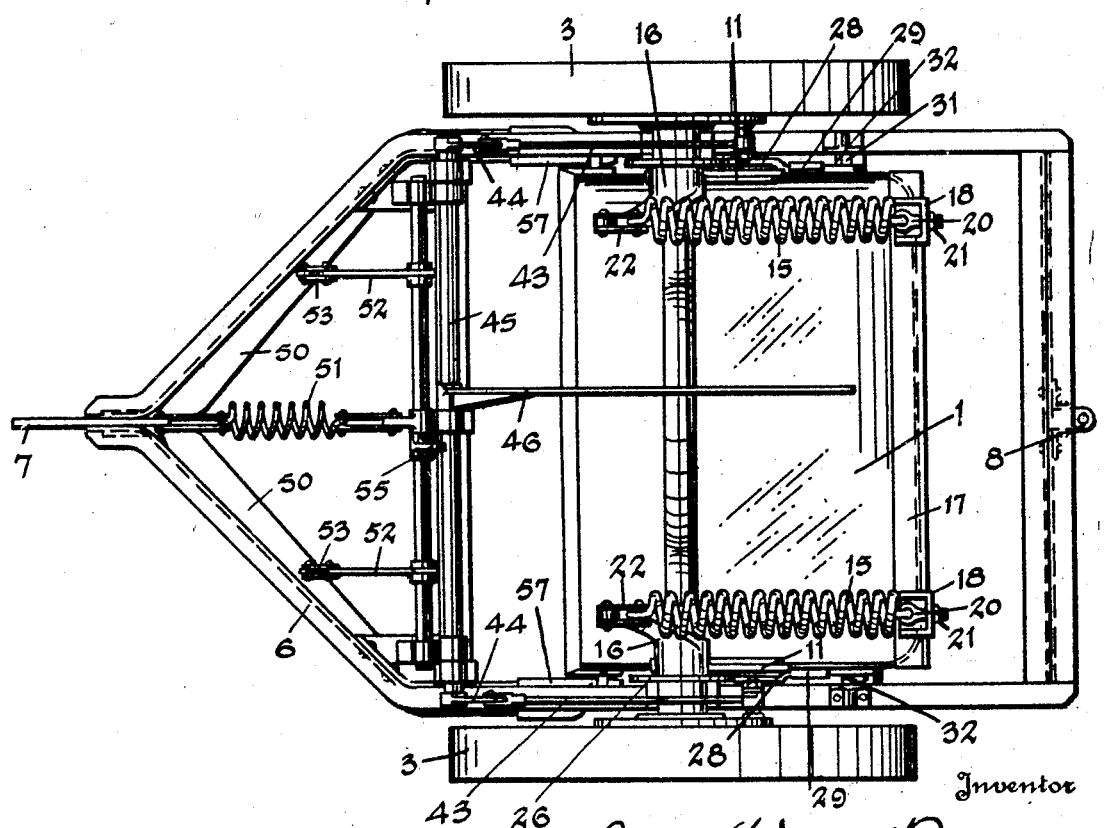
Figure 11:
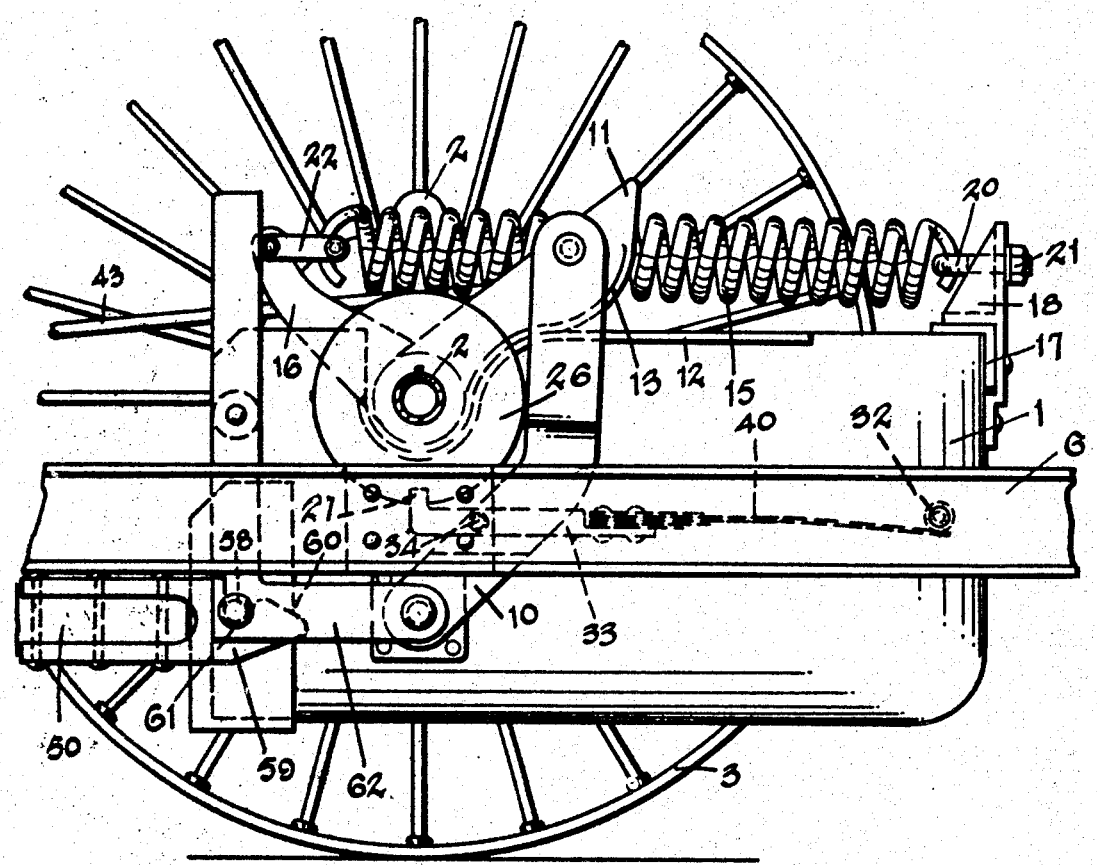
Figure 12:
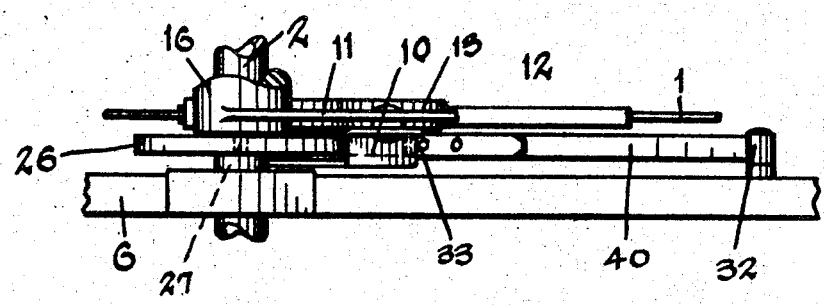

Fig. 1 illustrates a perspective view of the scoop structure selected as an example of embodiments of my invention. Fig. 2 is a top view of the structure shown in Fig. 1. Fig. 3 is a view of a vertical section extending centrally and longitudinally through the sulky scoop. Fig. 4 is a view similar to that shown in Fig. 3, the scoop bowl being shown in dumping position. Fig. 5 illustrates a section of a side wall of the bowl and of a supporting link. Fig. 6 illustrates a side view of a means for locking the bowl to the axle of the sulky. Fig. 7 is an end view of a locking means shown in Fig. 6. Fig. 8 is a top view of the locking means shown in Fig. 6. Fig. 9 illustrates a view of a section through the axis of one of the hubs of the wheel of the scoop structure. Fig. 10 is a diagrammatic view indicating movements of the bowl to produce the desired locking and unlocking connections between the bowl and the axle to maintain the bowl in load carrying position and to enable the bowl to be placed in load gathering and load dumping position. Fig. 11 illustrates a modified form of a locking means for interconnecting the bowl and the axle. Fig. 12 illustrates a top view of the locking means.

In the scoop structure shown in the drawings, the scoop bowl 1 is supported on the axle 2 that rotatably connects the wheels 3. The axle 2 may be bent centrally, as at 4, to give room for the dirt that will be piled in the central portion of the scoop bowl as it is gathered by the forward movement of the vehicle. The frame 6 is also carried by the axle and is provided with a suitable clevis 7 and a rear connecting pin 8 that may be used for forming a train of sulky scoops, that may be drawn by a suitable tractor. The scoop bowls of a train of sulkies may be controlled by ropes that pass through the ends of suitable controlling levers which may be engaged by knots formed in the ropes to manipulate the bowls to gather the earth, convey it to a suitable point and then dump it. The bowl 1 is carried by a pair of links 10 and a pair of arms 11. The arms 11 are keyed to the axle 2 and move therewith. The ends of the links 10 are connected to the ends of the arms 11 and to the sides of the bowl 1. Preferably the upper edge of the bowl 1 is flanged, as at 12, and the arms 11 are flanged, as at 13. The flanged portions 12 and 13 are curved to form a rocking contact area that may move progressively over the flanged portions as the bowl and the arm move relatively to each other, the arm 11 being rotated about the axis of the axle and the bowl being moved by the links 10. This operates to hold the bowl at the proper angle so that the cutting edge will enter the ground at the desired angle for assisting the springs to maintain the scoop in gathering position. In the movement of the bowl, portions of the flanges are held in contact with each other by the links 10, as shown in Figs. 3, 4 and 11. This prevents any free or loose play of the scoop with reference to the controlling mechanism and prevents any undue rattling that might otherwise be caused.

The scoop bowl is also held in position so as to maintain a contact relation between the flanges 12 and 13 of the bowl 1 and the arm 11 by means of the springs 15 that are connected to the rear end of the bowl and to the arms 16. The arms 16 are also keyed to the ends of the axle. The rear upper edge of the bowl 1 is provided with a reinforcing angle iron 17 and suitable brackets 18 are secured to the rear side of the scoop and to the angle irons 17. The springs are connected to swivel bolts 20 having nuts 21 that may be used for adjusting the tension of the springs 15 to produce the desired pressure of tthe cutting edge against the soil. The springs 15 may also be connected to suitable links 22 that are connected to the arms 16. The springs 15 thus coact with the links 10 to maintain the bowl in contact with the arms 11 and the flanges 12 and 13 in rolling or rocking relation to each other.

When the bowl 1 is in load carrying position, the springs 15 are subject to a tension or distortion that tends to draw the arms 16 to swing the axle 2 and swing the arms 11 to lower the bowl 1 to load gathering position. Such movement of the axle and the arms, however, is prevented by means of locks 25 which prevent movement of the bowl relative to the axle. The axle is provided with a pair of members 26 that may be made in the form of discs and which are keyed to the axle and moved therewith. The members or discs 26 are provided with recesses 27. In the form of construction shown in Figs. 6, 7, and 8, the discs are engaged by bolts 28 which form parts of the locking members 25. The bolts 28 are adapted to enter the recesses 27. The bolts 28 are slidably supported in suitable straps or shells 29 that are secured to the outer sides of the bowl 1. The bolts are moved by pivoted arms 30 which are provided with suitable spring strips 31. The frame 6 is provided with a pair of protruding pins or rollers 32 that engage the end of the spring strips 31 to manipulate the arms 30 that are supported on the bowl 1 to move the bolts 28 into, and out of, the recesses 27, as the spring strips 31 wipe over the rollers 32 by movement of the bowl 1, in one direction or the other. When the bolts 28 engage the discs 26, the bowl is connected to the axle and rotates with the axle. Thus, upon the slight rotative movement of the axle, the bowl is either connected or disconnected to or from the axle by the bolts.

When the bolts 28 are withdrawn, and the arms 10 and 11 are rotated, the links 10 lower the bowl to load gathering position, the springs 15 operating to move the bowl downward. As the bowl is moved against the surface of the ground, the front lower edge of the bowl digs beneath the surface and gathers the earth as the vehicle is drawn forward, until the bowl is filled.

In the form of construction shown in Figs. 11 and 12, the discs 26 are engaged by a pair of latches 33 that are pivotally supported on the side walls of the scoop by the pivot pins 34. The latches 33 are provided with springs 40 that engage the rollers 32 that are secured to the frame 6 of the scoop body. When the scoop passes downward through the load carrying position of the scoop, the latches 33 enter the recesses 27 and engage the discs 26, as in the form of construction shown in Figs. 6, 7, and 8. When the scoop is lowered from scoop dumping position and is carried through the load carrying position, the latches disengage the discs, as also in the operation of the engaging means, or lock, shown in Figs. 6, 7, and 8. The locks thus operate in the same manner and as described more in detail hereinafter.

When the bowl has been filled, it may be raised by interconnecting the axle 2 with the wheels 3. This rotates the arms 11 in a direction to raise the links 10, which in turn lift the bowl. It also angularly moves the arms 16 to deform the springs 15 and subject them to the required tension for succeeding lowering movements of the bowl to the load gathering position. The axle 2 is connected to the wheels 3 by means of suitable clutches 35. The clutches 35 may be of any form desired. In the structure shown, each clutch has a drum 36 and an expanding clutch member 37 that is expanded by a suitable cam 38, or by any other suitable means, such as links that are commonly used in connection with expanding clutches. The cam 38, if a cam is used, may be operated by a shaft 39 that is rotatably supported in a plate 41 that may be connected to the axle 2. Rotation of the shaft 39 thus produces clutch connection between the wheel 3 and the axle 2 and causes the axle to rotate with the wheel. An arm 42 is connected to the shaft 39 and a link 43 may be connected to the shaft 39 and a link 43 may be connected to the arm 42 and to one of the arms 44. The arms 44 are located on a shaft 45 that may be operated by a suitable lever 46. Angular movement of the lever 46 will thus cause a clutch connection between the opposite ends of the axle 2 and the wheels 3, and cause the axle to rotate with the wheels. This operates to lift the bowl 1 from the load gathering position to the load carrying position and, as the bowl is raised through the frame, and the spring 31 wipes the roller 32, the bolt 28 enters the socket 27 to interconnect the bowl with the axle and to prevent the return of the bowl by the action of the springs 15, if the clutch is released. The load may thus be conveyed away to the desired point where it may be dumped by producing clutch engagement and causing the axle and bowl to move together.

When the load is to be dumped, the lever 46 is operated to connect the axle with the wheel by the operation of the clutch 35 which carries the bowl upward and turns its bottom to substantially a vertical position and enables the discharge of the load. The clutch is then released and the bowl falls through the load carrying position by its own weight. To prevent dropping to load gathering position, it is caught by the clutch and engaged by the lock, as hereinafter described, and retained in the load carrying position. When the sulky scoop is again brought to the point where it is to be loaded, the scoop bowl is lowered to gather the dirt and when filled it is raised and conveyed away.

In order to maintain the bowl in position while its lower edge is cutting the soil and gathering it in the bowl, means is provided for directly connecting the forward end of the scoop with the frame. Thus a drag link 50 may be connected to the bowl and pivotally connected to the clevis 7. The bowl and the drag link are provided with means for releasably connecting one to the other in order that the bowl may be inverted to unload. Preferably, the drag link 50 is automatically raised upon upward movement of the bowl and manually disconnected from the bowl when it is inverted. The drag link will follow the bowl from the load gathering position to the load carrying position by reason of a spring 51 which is connected to the frame and to the crank lever 52, the crank lever 52 being connected to the drag link 50 by means of the link 53. The spring 51 is distorted when the bowl 1 is lowered by the springs 15 coacting with the weight of the bowl. It raises the link 50 when the bowl 1 is raised. When, however, it is desired to dump the load from the bowl, the crank lever 52 is angularly moved by means of a suitable lever 55 which moves the bowl connecting end of the link downward. The end of the drag link 50 is so formed that downward movement of the end of the drag link, relative to the bowl, will release the bowl from the end of the drag link.

The drag link has a latch member 57 for releasably connecting the drag link to a pin 58 located near the forward edge of the bowl. Preferably, the drag link 50 is bifurcated and its parts extend obliquely with reference to the longitudinal axis of the sulky scoop. It is provided with a pair of latches 57 which engage a pair of pins 58. Each of the latch members 57 is provided with a nose 59 having a sloping surface or edge 60 that terminates at a recess 61 formed on the upper sides of the latch members 57. When, therefore, the bowl 1 is in its load carrying position and the lever 55 is operated to disconnect the bowl from the drag link 50, the members 57 will be withdrawn from the pins 58 and the bowl may then be rotated to its load dumping position. Release of the lever 55 will enable the spring 51 to raise the drag link 50 up against the frame of the scoop. The pins 58 are so located on the bowl 1 that when the scoop returns to its load carrying position, the pins 58 will move over the inclined edges 60 and press the drag link 50 downward until the pins 58 enter the recess 61 and thus automatically connect with the drag link. The parts will be held in this engaging relation by the elasticity of the spring 51. Preferably a pair of L shaped bars 62 are secured to the side walls of the scoop for reinforcing the connections of the links 10 and the pins 58. The bars 62 are disposed in spaced and parallel relation to the side walls of the scoop and form guides for directing the latch members 57 to the pins 58, particularly as to any lateral displacement of the latches relative to the forward side edges of the scoop. When, therefore, the bowl 1 is moved to the load gathering position, the connection with the drag link will be maintained and the drag link will cooperate to draw the bowl while its edge is being forced through the soil.

In the operation of the sulky scoop, movements of the bowl are controlled by the levers 46 and 55 and the connection of the bowl with the axle that is established by the lock 25. The movements of the bowl, produced by the operation of the clutches, as controlled by the lever 46, to connect the axle with the wheels, and the coaction of the lock mechanism 25 is illustrated in the diagram shown in Fig. 10. Assuming that the lock is in the position indicated in Fig. 6, that is, when the bowl is in the load carrying position, then in order to lower the bowl to load gathering position, the bowl must be raised a short distance in order to unlock the bowl from the axle. This is done by the operation of the lever 46 producing a short upward movement of the bowl, as indicated by the arrow 65, whereupon the bowl 1 may be lowered. The spring 31 then wipes over the roller 32 in the opposite direction which pulls the bolt 28 from the socket 27. The bowl may then be lowered to the load gathering position by the operation of the springs 15, as indicated by the line 66. When the bowl has been filled, it may be raised upon the operation of the lever 46 to connect the axle with the wheels. When the bowl reaches the load carrying position, as indicated by the line 67, the spring 31 strikes the roller 32 and moves the bolt 28 into the socket 27 to lock the bowl to the axle. When it is desired to dump the bowl, the lever arm 46 is operated which again connects the axle to the wheels and the bowl is angularly moved to unloading position, as indicated by the line 68. The bowl may then be allowed to return through the load carrying position, as indicated by the line 69, the clutch being released upon releasement of the lever. Ordinarily the bowl would move through the load carrying position by reason of the fact that the spring 31 passes over the roller 32 in a direction to withdraw the locking bolt 28 from the socket 27. However, the axle may again be clutched by the operation of the lever 46 until the spring 31 passes the roller 32 and raised a short distance, as indicated by the line 70. The clutch connection may be then released and the bowl allowed to drop by its own weight the short distance, indicated by the line 71, to allow the spring 31 to engage the roller 32 and lock the bowl to the axle. The bowl will then be retained in its load carrying position and, when it is desired to again lower the bowl to the load gathering position, the bowl is raised until the spring 31 passes the roller 32, as indicated by the line 65, and then lowered and, as the bowl leaves the load carrying position, the spring 31 will draw the bolt 28 from the recess 27 so that the bowl may descend, as indicated by the line 66. When the bowl passes through the load carrying position from the load dumping position, it automatically connects with the drag link preparatory to gathering the load when the bowl is further lowered.

I claim:

1. In a vehicle scoop, a scoop bowl carried by the vehicle, a spring connected to the bowl, means for raising the bowl relative to the vehicle, means connected to the spring for distorting the spring when the bowl is raised, and means for releasably holding the bowl in its raised position, the spring operating to lower the bowl when it is released from its raised position.

2. In a vehicle scoop, a scoop bowl supported by the vehicle, a spring connected to the bowl, a traction member, means for connecting the traction member to the bowl and to the spring for distorting the spring and for raising the bowl relative to the vehicle, the spring operating to lower the bowl when the traction member is released from the bowl and the spring.

3. In a vehicle scoop, a scoop bowl supported by the vehicle, a spring connected to the bowl, a traction member, means for connecting the traction member to the bowl to raise the bowl, and means operated by the traction member for distorting the spring when the bowl is raised, the spring operating to lower the bowl when the bowl is released.

4. In a vehicle scoop, a vehicle frame, a scoop bowl supported by the vehicle, a spring connected to the bowl, a traction member, means for connecting the traction member to the bowl to raise the bowl, means operated by the traction member for distorting the spring when the bowl is raised, and a means for locking the bowl to the frame when the bowl is raised, the spring operating to lower the bowl when the bowl is released.

5. In a vehicle scoop, a vehicle frame, a scoop bowl supported by the vehicle, a spring connected to the bowl, a traction member, means for connecting the traction member to the bowl to raise the bowl, and means operated by the traction member for distorting the spring when the bowl is raised, means for securing the bowl to the frame when the bowl is raised, the spring operating to lower the bowl when the bowl is released, and means operated by the traction member for releasing the bowl from the frame.

6. In a vehicle scoop, a vehicle frame, a scoop bowl supported by the vehicle, a spring connected to the bowl, a traction member, means for connecting the traction member to the bowl to raise the bowl, means operated by the traction member for distorting the spring when the bowl is raised, means for securing the bowl to the frame when the bowl is raised, the spring operating to lower the bowl when the bowl is released, and means operated by the movement of the bowl for releasing the bowl from the frame.

7. In a vehicle scoop, a vehicle frame, a scoop bowl, a spring connected to the bowl, a traction member, means for connecting the traction member to the bowl to raise the bowl, means operated by the traction member for distorting the spring when the bowl is raised, a lock means for securing the bowl to the frame by an upward movement of the bowl and for releasing the bowl by a downward movement of the bowl.

8. In a vehicle scoop having an oscillatory axle, a scoop bowl carried by the axle, a traction member, means for connecting the axle to the traction member for raising the bowl relative to the vehicle, a spring connected to the bowl and the said axle, whereby the spring is distorted when the bowl is raised relative to the vehicle, and a locking means for securing the bowl to the frame of the vehicle when the bowl is in its raised position for preventing lowering operation by the spring when the axle is released from the traction member.

9. In a vehicle scoop having an oscillatory axle, a scoop bowl carried by the axle, a traction member, means for connecting the axle to the traction member for raising the bowl relative to the vehicle, a spring connected to the bowl and the said axle, whereby the spring is distorted when the bowl is raised relative to the vehicle, a locking means for securing the bowl to the frame of the vehicle when the bowl is in its raised position for preventing lowering operation by the spring when the axle is released from the traction member, and means for releasing the bowl from the frame, the spring operating to lower the bowl.

10. In a vehicle scoop, a traction member, a vehicle frame, a scoop bowl carried by the vehicle, a spring connected to the bowl, means for connecting the bowl and the spring to the traction member for distorting the spring and raising the bowl relative to the frame and for rotating the bowl and the spring relative to the frame, a locking means for connecting the bowl to the frame when the bowl is raised to maintain the spring distorted when the bowl is released from the traction member, the spring operating to lower the bowl when the bowl is released from the frame, and means for releasing the lock by movement of the bowl relative to the frame by the said traction means.

11. In a vehicle scoop having an oscillatory axle, a scoop bowl carried by the axle, a traction member, means for connecting the axle to the traction member for raising the bowl relative to the vehicle, a spring connected to the bowl and the said axle, whereby the spring is distorted when the bowl is raised relative to the vehicle, a locking means for securing the bowl to the frame of the vehicle when the bowl is in its raised position for preventing lowering operation by the spring when the axle is released from the traction member, and means for releasing the bowl from the frame by consecutive upward and lowering movements of the bowl relative to the frame.

12. In a vehicle scoop, a traction member, a vehicle frame, an axle rotatably supported in the vehicle frame, a scoop bowl carried by the axle, a clutch for connecting the axle to the traction member, a spring connected to the bowl and to the axle, the axle operating to distort the spring and raise the bowl relative to the frame when connected to the traction member and for rotating the bowl and the spring relative to the frame, the spring operating to lower the bowl relative to the frame when the axle is released from the traction member.

13. In a vehicle scoop, a traction member, a vehicle frame, an axle rotatably supported in the vehicle frame, a scoop bowl carried by the axle, a clutch for connecting the axle to the traction member, a spring connected to the bowl and to the axle, the axle operating to distort the spring and raise the bowl relative to the frame when connected to the traction member and for rotating the bowl and the spring relative to the frame, a locking means for securing the bowl to the frame of the vehicle when the bowl is raised to maintain the spring distorted when the axle is released from the traction member, and means for releasing the bowl from the frame.

14. In a vehicle scoop, a traction member, a vehicle frame, an axle rotatably supported in the vehicle frame, a scoop bowl carried by the axle, a clutch for connecting the axle to the traction member, a spring connected to the bowl and to the axle, the axle operating to distort the spring and raise the bowl relative to the frame when connected to the traction member and for rotating the bowl and the spring relative to the frame, a locking means for securing the bowl to the frame of the vehicle when the bowl is raised to maintain the spring distorted when the axle is released from the traction member, and means for releasing the bowl from the frame by movement of the axle by the traction member.

15. In a vehicle scoop, a traction member, a vehicle frame, an axle rotatably supported in the vehicle frame, a scoop bowl carried by the axle, a clutch for connecting the axle to the traction member, a spring connected to the bowl and to the axle, the axle operating to distort the spring and raise the bowl relative to the frame when connected to the traction member and for rotating the bowl and the spring relative to the frame, a locking means for securing the bowl to the frame of the vehicle when the bowl is raised to maintain the spring distorted when the axle is released from the traction member, and means for releasing the bowl from the frame by movements of the axle to rotate the bowl towards dumping position and then towards load gathering position.

16. In a vehicle scoop, a traction member, a vehicle frame, an axle rotatably supported in the vehicle frame, a scoop bowl carried by the axle, a clutch for connecting the axle to the traction member, a spring connected to the bowl and to the axle, the axle operating to distort the spring and raise the bowl relative to the frame when connected to the traction member and for rotating the bowl and the spring relative to the frame, a locking means for securing the bowl to the frame of the vehicle when the bowl is raised to maintain the spring distorted when the axle is released from the traction member, and means for releasing the bowl from the frame by movement of the axle by the traction member, the spring operating to lower the bowl when the bawl is released from the frame.

17. In a vehicle scoop, a traction member, a vehicle frame, an axle supported in the vehicle frame for oscillatory movements, an arm connected to the axle, a scoop bowl carried by the arm, a second arm connected to the axle, a spring connected to the bowl and to the said second arm, a clutch for connecting the axle to the traction member for distorting the spring and raising the bowl relative to the frame and for rotating the bowl and the spring relative to the frame, the spring operating to lower the bowl relative to the frame when the axle is released from the traction member.

18. In a vehicle scoop, a traction member, a vehicle frame, an axle supported in the vehicle frame for oscillatory movements, an arm connected to the axle, a scoop bowl carried by the arm, a second arm connected to the axle, a spring connected to the bowl and to the said second arm, a clutch for connecting the axle to the traction member for distorting the spring and raising the bowl relative to the frame and for rotating the bowl and the spring in one direction relative to the frame, the weight of the bowl operating to rotate the bowl in a reverse direction, and the spring operating to forcibly lower the bowl when the axle is released from the clutch.

19. In a vehicle scoop, a traction member, a vehicle frame, an axle oscillatably supported in the frame, a clutch for connecting the axle to the traction member, an arm connected to the axle, a scoop bowl carried by the arm, a second arm connected to the axle, a spring connected to the rear end of the bowl and to the said second arm, the axle operating to raise the bowl and distort the spring when connected to the traction member and for rotating the bowl and the distorted spring to dump the bowl, means movable with the axle for engaging the bowl at a point intermediate the point on the bowl to which the first named arm is connected and the point on the bowl to which the spring is connected for depressing the bowl when the axle is released from the traction member.

20. In a vehicle scoop, a traction member, a vehicle frame, an axle oscillatably supported in the frame, a clutch for connecting the axle to the traction member, an arm connected to the axle, a scoop bowl carried by the arm, a second arm connected to the axle, a spring connected to the rear end of the bowl and to the arm, the axle operating to raise the bowl and distort the spring when connected to the traction member and for rotating the bowl and the distorted spring to dump the bowl, a locking means for securing the bowl to the frame, a part movable with the axle for engaging and rocking on the bowl intermediate the points of connection of the first named arm with the bowl and the connection of the spring with the bowl for depressing the bowl by the operation of the spring when the axle is released from the traction member and the frame.

In witness whereof I have hereunto signed my name to this specification.

JULIUS WESLEY PATTERSON.